(12) United States Patent
Biglari et al.

(10) Patent No.: US 10,076,124 B2
(45) Date of Patent: Sep. 18, 2018

(54) RAPID-AGITATION MIXER FOR FOOD PRODUCTS

(71) Applicant: Steak 'n Shake Enterprises, Inc., Indianapolis, IN (US)

(72) Inventors: Sardar Biglari, San Antonio, TX (US); David Milton, Garner, NC (US)

(73) Assignee: Steak 'n Shake Enterprises, Inc., Indianapolis, IN (US)

( * ) Notice: Subject to any disclaimer, the term of this patent is extended or adjusted under 35 U.S.C. 154(b) by 689 days.

(21) Appl. No.: 14/657,400

(22) Filed: Mar. 13, 2015

(65) Prior Publication Data
US 2016/0262573 A1    Sep. 15, 2016

(51) Int. Cl.
| | |
|---|---|
| *A23G 9/12* | (2006.01) |
| *B01F 11/00* | (2006.01) |
| *B01F 15/00* | (2006.01) |
| *B01F 15/06* | (2006.01) |
| *A23G 9/04* | (2006.01) |
| *A23G 9/22* | (2006.01) |

(52) U.S. Cl.
CPC .............. *A23G 9/12* (2013.01); *A23G 9/045* (2013.01); *A23G 9/224* (2013.01); *B01F 11/0002* (2013.01); *B01F 11/0017* (2013.01); *B01F 11/0022* (2013.01); *B01F 11/0025* (2013.01); *B01F 15/0074* (2013.01); *B01F 15/00175* (2013.01); *B01F 15/00194* (2013.01); *B01F 15/00201* (2013.01); *B01F 15/00285* (2013.01); *B01F 15/00318* (2013.01); *B01F 15/00746* (2013.01); *B01F 15/00883* (2013.01); *B01F 15/067* (2013.01); *B01F 2215/0021* (2013.01)

(58) Field of Classification Search
USPC .......................................................... 366/144
See application file for complete search history.

(56) References Cited

U.S. PATENT DOCUMENTS

| | | |
|---|---|---|
| 3,181,841 A | 5/1965 | Boehm |
| 3,706,443 A | 12/1972 | Oberhauser |
| 3,941,357 A | 3/1976 | Wurtz |
| 4,523,855 A | 6/1985 | Walker |

(Continued)

FOREIGN PATENT DOCUMENTS

| | | |
|---|---|---|
| CN | 102883622 | 1/2013 |
| EP | 0945170 | 3/1999 |

(Continued)

OTHER PUBLICATIONS

FR 2 857 574, Jan. 2005, Hurtebise, machine translation.*
International Search Report dated Jul. 11, 2016 in connection with PCT/US2016/021928.

*Primary Examiner* — Mark Halpern
(74) *Attorney, Agent, or Firm* — Parker Ibrahim & Berg LLC; James M. Behmke; Stephen D. LeBarron

(57) ABSTRACT

The techniques described herein provide, in one embodiment, a rapid-agitation mixer for food products that comprises a product holder configured to hold a sealed product cup containing a food product to be mixed, and a drive shaft along an agitation axis, the drive shaft configured to secure the product holder and product cup in place. The illustrative mixer also comprises a drive motor configured to reciprocate the drive shaft in opposing directions, where the product holder correspondingly reciprocates the product cup to churn the food product within the product cup.

12 Claims, 17 Drawing Sheets

(56) References Cited

U.S. PATENT DOCUMENTS

| | | |
|---|---|---|
| 4,697,929 A | 10/1987 | Muller |
| 4,737,372 A | 4/1988 | Bender |
| 4,834,548 A | 5/1989 | Tempel et al. |
| 5,102,229 A | 4/1992 | Wada et al. |
| 5,150,967 A | 9/1992 | Neilson et al. |
| 5,302,020 A | 4/1994 | Kruse |
| 5,352,037 A | 10/1994 | Jouvin |
| 5,507,575 A | 4/1996 | Rossetti |
| 5,547,275 A | 8/1996 | Lillelund et al. |
| 5,653,157 A | 8/1997 | Miller |
| 5,803,377 A | 9/1998 | Farrell |
| 5,868,065 A | 2/1999 | Haggerty et al. |
| 5,884,999 A | 5/1999 | Muzzio et al. |
| 5,962,060 A | 10/1999 | Farrell |
| 6,041,961 A | 5/2000 | Farrell |
| 6,326,047 B1 | 12/2001 | Farrell |
| 6,421,583 B1 | 7/2002 | Sudolcan et al. |
| 6,465,034 B2 | 10/2002 | Farrell |
| 6,474,862 B2 | 11/2002 | Farrell |
| 6,527,207 B1 | 3/2003 | Farrell et al. |
| 6,755,565 B2 | 6/2004 | Flackett |
| 7,036,334 B2 | 5/2006 | Ko et al. |
| 7,059,763 B2 | 6/2006 | Sordelli et al. |
| 7,144,150 B2 | 12/2006 | Farrell |
| 7,325,969 B2 | 2/2008 | Kretzschmar et al. |
| 7,448,546 B2 | 11/2008 | Jung et al. |
| 7,520,658 B2 | 4/2009 | Farrell |
| 7,520,662 B2 | 4/2009 | Farrell |
| 7,604,392 B2 | 10/2009 | Brezinsky et al. |
| 7,726,136 B2 | 6/2010 | Baxter et al. |
| 7,806,294 B2 | 10/2010 | Gatipon et al. |
| 1,001,347 A1 | 1/2011 | Chaudhuri et al. |
| 1,002,050 A1 | 1/2011 | Santoiemmo |
| 7,890,213 B2 | 2/2011 | Greco et al. |
| 7,908,871 B2 | 3/2011 | Baxter et al. |
| 8,151,577 B2 | 4/2012 | Bucceri |
| 8,336,731 B2 | 12/2012 | Farrell et al. |
| 8,459,043 B2 | 6/2013 | Bertone |
| 8,651,730 B2 | 2/2014 | Barbi |
| 2003/0046377 A1 | 3/2003 | Daum et al. |
| 2005/0193896 A1 | 9/2005 | McGill |
| 2008/0279040 A1 | 11/2008 | Neilson et al. |
| 2009/0083000 A1 | 3/2009 | Sherman et al. |
| 2009/0120306 A1 | 5/2009 | DeCarlo et al. |
| 2009/0193823 A1 | 8/2009 | Lee et al. |
| 2010/0239723 A1 | 9/2010 | Pendergast et al. |
| 2011/0013477 A1 | 1/2011 | Kozlowski et al. |
| 2011/0088558 A1 | 4/2011 | Farrell et al. |
| 2011/0088568 A1 | 4/2011 | Farrell et al. |
| 2011/0090756 A1 | 4/2011 | Farrell et al. |
| 2011/0239868 A1 | 10/2011 | Farrell et al. |
| 2012/0128834 A1 | 5/2012 | Westdijk et al. |
| 2013/0280385 A1 | 10/2013 | Arns et al. |
| 2013/0284029 A1 | 10/2013 | Reed et al. |
| 2013/0341439 A1 | 12/2013 | Farrell et al. |
| 2013/0341446 A1 | 12/2013 | Farrell et al. |
| 2013/0343150 A1 | 12/2013 | Farrell et al. |
| 2013/0344220 A1 | 12/2013 | Farrell et al. |
| 2013/0344221 A1 | 12/2013 | Farrell et al. |
| 2014/0016431 A1 | 1/2014 | Takenaka et al. |
| 2014/0161946 A1 | 6/2014 | Torricelli et al. |
| 2014/0188271 A1 | 7/2014 | Hernandez et al. |
| 2014/0199445 A1 | 7/2014 | Torricelli et al. |
| 2014/0293729 A1 | 10/2014 | Ni et al. |
| 2014/0295044 A1 | 10/2014 | Cocchi et al. |

FOREIGN PATENT DOCUMENTS

| | | |
|---|---|---|
| EP | 1026978 A1 | 8/2000 |
| EP | 1114673 A2 | 7/2001 |
| EP | 1279359 | 12/2009 |
| EP | 2413118 A1 | 2/2012 |
| FR | 2857574 A1 | 1/2005 |
| WO | WO-1993005345 | 3/1993 |
| WO | WO-2006/077237 A1 | 7/2006 |
| WO | WO-2006082214 | 8/2006 |
| WO | WO-2010064042 | 6/2010 |
| WO | WO-2013090768 | 6/2013 |

* cited by examiner

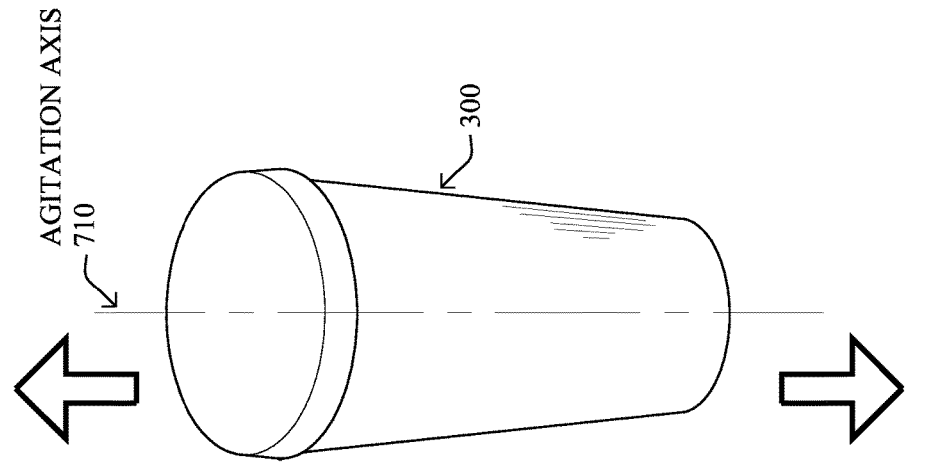

RAPID-AGITATION MIXER FOR FOOD PRODUCTS

TECHNICAL FIELD

The present disclosure relates generally to food product mixing, and, more particularly, to a rapid-agitation mixer for food products.

BACKGROUND

The preparation of many different food and beverage products has evolved greatly over time. For instance, in addition to formulaic and/or recipe changes, many different types of machines, appliances, and processes have been created, allowing for simplified production, automated production, mass production and/or distribution, and so on. While certain of these changes have occurred at food or beverage processing plants, many improvements have also been presented in the area of food and beverage services, such as for restaurants, convenience stores, and home use.

Milkshakes, malts, and other ice cream mixtures are one such area where improved machines and/or processes have been offered in an effort to provide a consumer with an optimal product for consumption. For example, since consistency is a major factor in milkshake enjoyment, many advances have been made regarding their blending, whipping, stirring, etc., where typically, a rotary blade or mixer is either lowered into a container holding the consumable content, or else the container is advanced towards the rotary blade/mixer to move the container's contents into contact with the blade/mixer.

When implemented at a restaurant (e.g., an ice cream shop), a server generally takes an order from a customer, inserts the appropriate contents into the container (e.g., ice cream, candies, flavor syrups, etc.), and then mixes the product to the desired consistency using an associated mixing/blending machine. Prior to mixing another product with different ingredients, the machine's components (e.g., blades/mixers/etc.) should then be cleaned by the server in order to avoid cross-contamination between orders, and to remain a generally clean food-service environment.

More recent technological advances have allowed for a milkshake or other frozen drink to be made quickly from a block of ingredients pre-frozen into a serving cup. For instance, a consumer may now choose the type or flavor to be prepared, and insert the pre-packaged container into an automated machine, which automatically inserts the blades/mixers into the container, and mixes/blends the contents to provide the finished product, e.g. the blended milkshake, at the desired consistency, to the consumer. In some machines, various ingredients may also be added to the mixture during the mixing/blending, such as milk, water, syrups, candies, etc. These types of machines thus minimize or eliminate the requirement of a specialized server, and certain of these machines also have provisions for automating the cleaning of the blades/mixers and various splash shields that are in place to protect the user and surrounding environment from contents that spill from the containers during use.

SUMMARY

The one or more embodiments of the present invention described herein advance the production of foods and beverages ("food products" herein), particularly for milkshakes, malts, or other ice cream beverages, beyond the current technologies described above.

In particular, in one embodiment, a rapid-agitation mixer for food products comprises a product holder configured to hold a sealed product cup containing a food product to be mixed, and a drive shaft along an agitation axis, the drive shaft configured to secure the product holder and product cup in place. The illustrative mixer also comprises a drive motor configured to reciprocate the drive shaft in opposing directions, where the product holder correspondingly reciprocates the product cup to churn the food product within the product cup.

Other specific embodiments and implementations are described in greater detail below, and this brief summary is not meant to be limiting to the scope of protection of the invention described herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example of rapid-agitation mixing in accordance with one or more embodiments herein;

DETAILED DESCRIPTION OF EXAMPLE EMBODIMENTS

As noted above, milkshakes, malts, and other ice cream mixtures are one such area where improved machines and/or processes have been offered in an effort to provide a consumer with an optimal product for consumption. Current systems, however, suffer from one or more inefficiencies. For example, cleanliness is a major concern for food preparation, both in terms of sanitary conditions as well as for cross-contamination of products. Though many systems are in place currently that provide for automated cleaning (e.g., water sprayers, wash-downs, etc.), such systems are generally meant to mitigate the inevitable spillage from the associated food product preparation process. Other systems in use today may attempt to reduce the amount of overall clean-up required, such as by covering the food container into which the blades/mixers are to be inserted prior to the mixing/blending, but such systems only reduce the amount of spillage outside of the food container during the preparation, and still require cleaning of the blades/mixers after each use.

Furthermore, as noted above, the consistency of such semi-frozen food products is an important factor in consumer enjoyment. Achieving the desired consistency has been limited to the use of blades, mixers, paddles, or other objects being inserted into and moved within the food product, such as by stirring, blending, agitating, pulverizing, etc. In certain systems currently in use in the art, the blending object may be integrated within the food container, where a rotating motor contacts with an engaging member of the container in order to correspondingly rotate the blending mechanism within the container (e.g., much like a household blender operation). Such systems, however, come at an increased container expense and complexity, and leave the blending mechanism inside the container during consumer consumption of the product.

Figure 1:
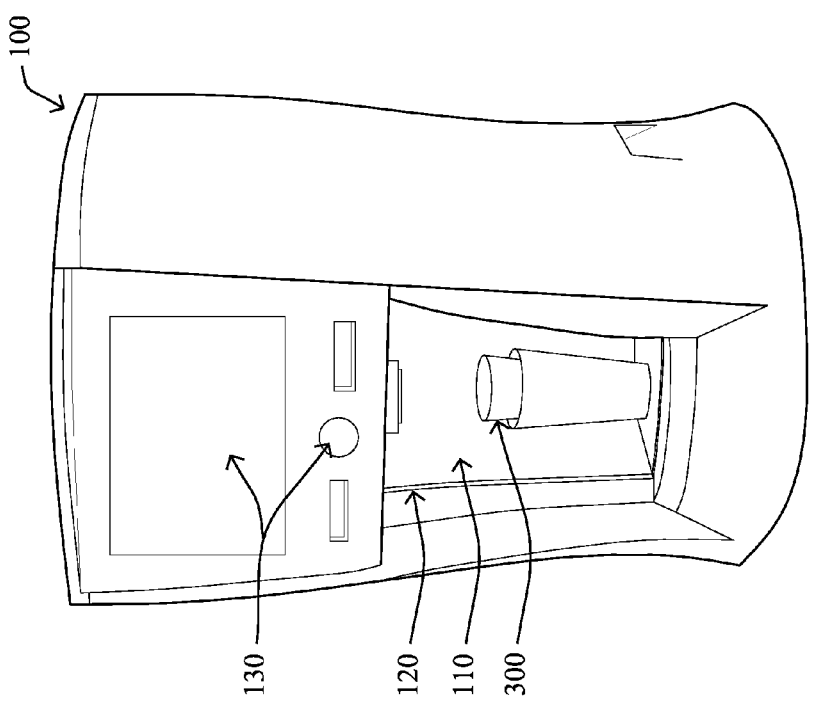
FIG. 1 illustrates an example mixer for food products in accordance with one or more embodiments herein.

FIG. 1 illustrates an example mixer for food products in accordance with one or more embodiments herein. Illustratively, mixer 100 may be used according to the techniques herein to "mix" a food product, which may also be referred to as shaking, bending, agitating, and so on. Specifically, the mixer 100 is generally intended to provide a method and apparatus to mix a food product (e.g., mostly frozen) without opening a sealed product cup 300 (shown below in FIGS. 3A and 3B). For example, milkshakes, malts, or other ice cream products are typically a thick, viscous fluid, which may require fluidizing prior to consumer consumption. Contrary to current technologies, however, the mixer 100 is able to mix such a food product and create the desired consistency without the problems associated with mixing blades, agitators, paddles, etc. being inserted into the food product, such as those mentioned above (e.g., cleanliness, sanitary considerations, service requirements, etc.).

As described in greater detail below, the mixer 100 uses increased force created by controlled movement of the product cup 300 in order to mix the food product. Specifically, through internal mixing completely inside of a sealed product cup 300, the mixer 100 operates in a manner that can take a heterogeneous solid, semi-solid, or liquid food product, whether frozen, semi-frozen, or un-frozen, and turn it into a generally homogenous consumable food product (e.g., a milkshake).

Illustratively, the example food product mixer 100 may comprise a mixing chamber 110 into which the food product cup 300 may be placed, and a protective door 120 that may be manually or automatically controlled to open and close (e.g., in either implementation with one or more sensors to ensure that the door is closed prior to operation of the mixer 100). Note that while the door 120 is shown opening and closing in a side-to-side manner, any other suitable opening/closing motion (e.g., up-and-down motion) are suitable for use with the embodiments herein. The food product mixer 100 may also comprise one or more user interface features 130, such as various control buttons, touch screen displays, wireless interfaces (e.g., for smartphone access, maintenance, etc.) and so on.

Figure 2:
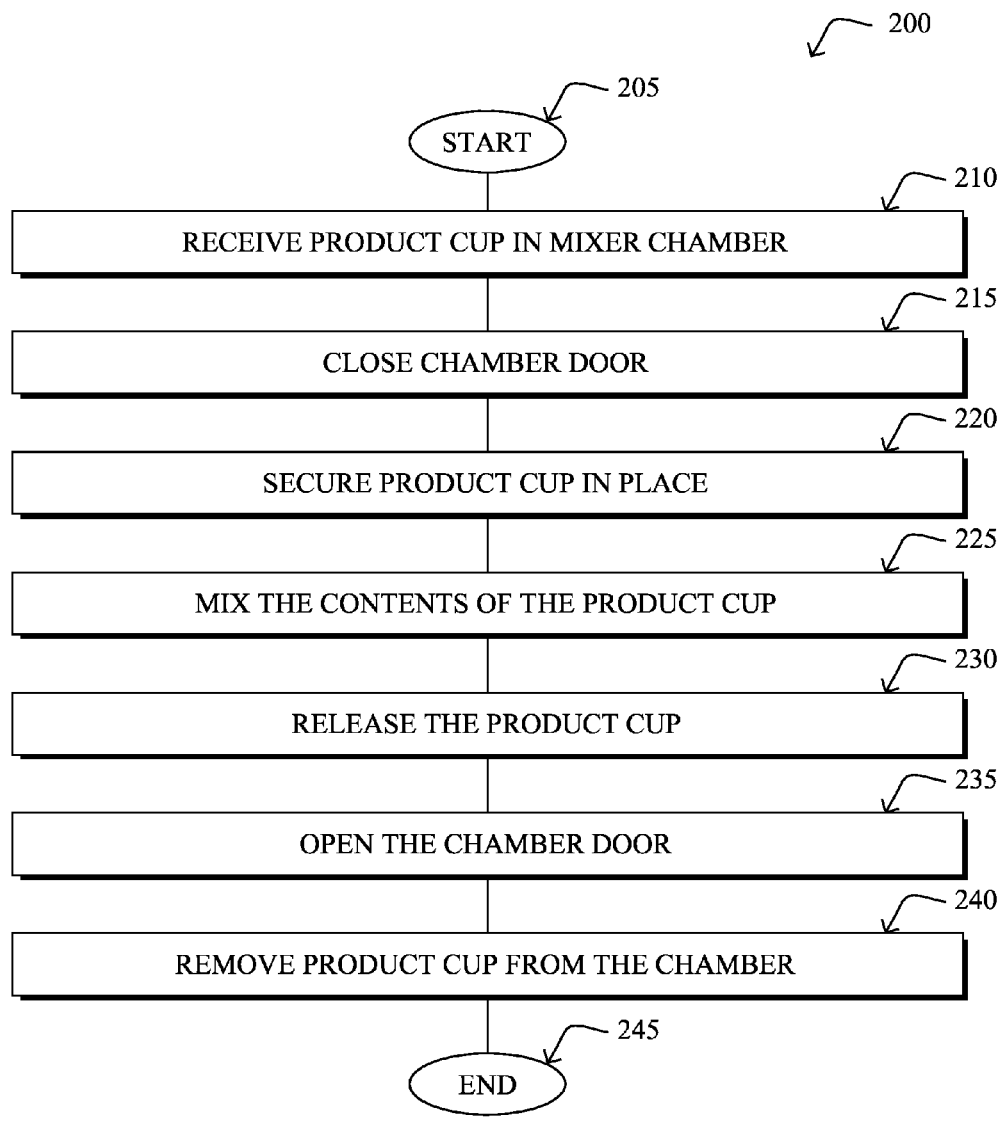
FIG. 2 illustrates an example simplified procedure for mixing food products in accordance with one or more embodiments herein.

In general, the food product mixer 100 may be designed for direct and straightforward use by the consumer, such as for self-serve stations at restaurants, convenience stores, homes, cafeterias, hotels, fairs, college campuses, etc. FIG. 2 illustrates an example simplified procedure for food product mixing in accordance with one or more embodiments described herein using the mixer 100 above. The simplified procedure 200 may start at step 205, and continues to step 210, where the mixer 100 receives a product cup 300 in chamber 110, and the door 120 is closed in step 215. In step 220 the product cup 300 may be secured in place, and then the mixer 100 mixes the contents of the product cup in step 225. The product cup may then be released in step 230, the door opens in step 235, and the product cup may then be removed from the chamber in step 240. The procedure 200 is then complete in step 245, allowing the consumer to enjoy the prepared food product.

An important aspect of the mixer 100 and procedure 200 above is to provide a simplified end-user experience of the mixer 100, that is repeatable without servicing the mixer (e.g., manual or automated cleaning). That is, the product cup 300 can be selected directly from a product placement display (e.g., a freezer/refrigerator), placed into the mixer 100, and mixed. This efficient process generally requires no user intervention to create the desired mixture (e.g., no added ingredients), no user intervention to properly mix the product (e.g., moving the cup 300 around to ensure adequate mixing), and no per-use cleanup (except in the case of an accidental product cup breach). Note, however, that although the simplified design of the example mixer 100 is important, both in terms of the user interface and the overall ease-of-operation, such simplification is not necessary to the internal workings and functionality of the mixer as described below, and the scope of the present invention is not intended to be limited to the example implementation shown in FIG. 1.

According to the illustrative techniques herein, the user operation of the mixer 100 may be as simple as inserting the product cup 300 into the chamber 110, and pressing a single "start" button (user interface component 130), such that the mixer 100 may perform the remainder of the mixing operation autonomously (e.g., closing the door 120, securing the cup, mixing, etc.). In one embodiment, this type of "insert and mix" operation assumes the same mixing parameters for all food products to be mixed the same way. Alternatively or in addition, the mixer 100 may also be configured to change various aspects of the mixing procedure, for example, various mixing parameters such as duration, speed, etc. (described below). These adjustments may be requested by the user (e.g., entering preferences through user interface 130), or else they may be adjusted automatically by the mixer 100 based on a determination (e.g., user selection and/or sensing) of various product-specific characterizations.

Figure 3B:
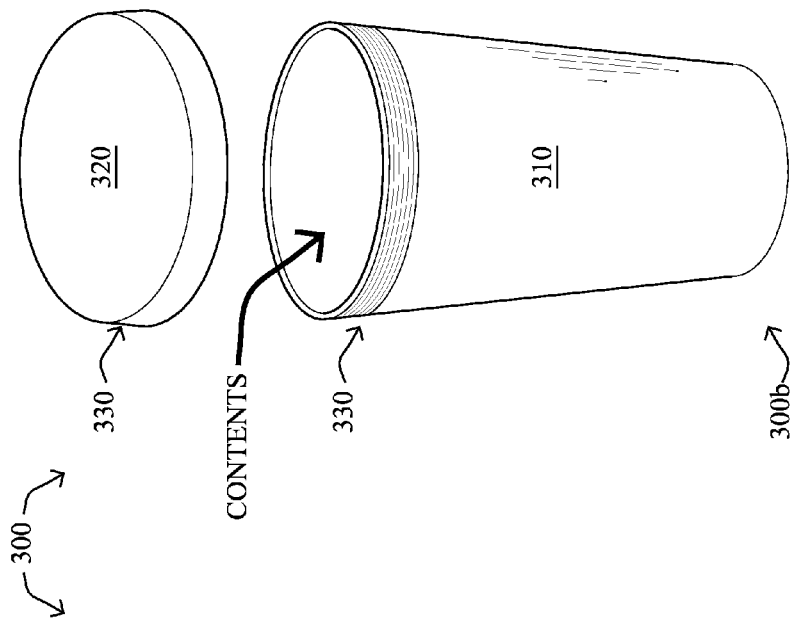
FIGS. 3A and 3B illustrate examples of sealed cups (sealed and sealable) for use with a mixer for food products in accordance with one or more embodiments herein.
Figure 3A:
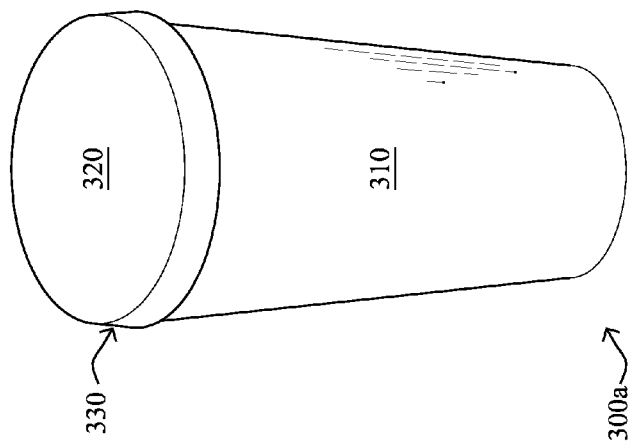

As mentioned above, another important aspect of the mixer 100 is its cleanliness, and this is illustratively accomplished in one or more ways. First, by allowing the product cup 300 to remain completely sealed throughout the mixing process, there are no components of the mixer 100 that are purposefully contacting the food product within the cup 300, such as blades, paddles, agitators, etc. FIGS. 3A and 3B, for instance, illustrate examples of sealed cups for use with a mixer for food products in accordance with one or more embodiments herein. FIG. 3A, in particular, shows a simplified product cup 300 (300a, specifically) that comes sealed from the factory, with a base 310, a top or cap 320, and a seal 330, which may or may not be the same point of access for consumer access to the contained product. In addition, an alternative embodiment allows for a sealable arrangement, shown in FIG. 3B, where a user (e.g., consumer, server, etc.) can prepare custom ingredients inside the base 310 of the product cup 300 (300b, specifically), and then can create the seal 330 by screwing on the top or cap 320 (or other securing mechanism/technique). (Note that cup 300b of FIG. 3B may also come pre-filled from the factory, where the consumer access is unscrewing the top or cap 320.)

As stated previously, the sealed cup 300 need not be opened during the mixing, and preferably (where pre-filled by the factory) need not be opened prior to the mixing, either. That is, by supplying pre-made, single-serve product cups 300 with the desired food product contents (e.g., milkshake ingredients), no mixes need to be added, no contamination need occur, and no mess needs to be created inside with mixer 100. For example, if a consumer wishes to have a vanilla shake, he or she simply picks the product cup 300 containing the vanilla shake, places it into the mixer 100, starts the mixer, and removes the product cup to enjoy the vanilla shake. Conversely, if another consumer then wishes to have a cookies and cream shake, he or she simply picks the product cup 300 containing the cookies and cream shake, places it into the mixer 100, starts the mixer, and removes the product cup to enjoy the cookies and cream shake. No cleaning need take place, no additives need be supplied, and no time is wasted. (Notably, after the product is mixed, the consumer can certainly open the cup 300 and add his or her own ingredients to the mixed food product.)

Figure 4A:
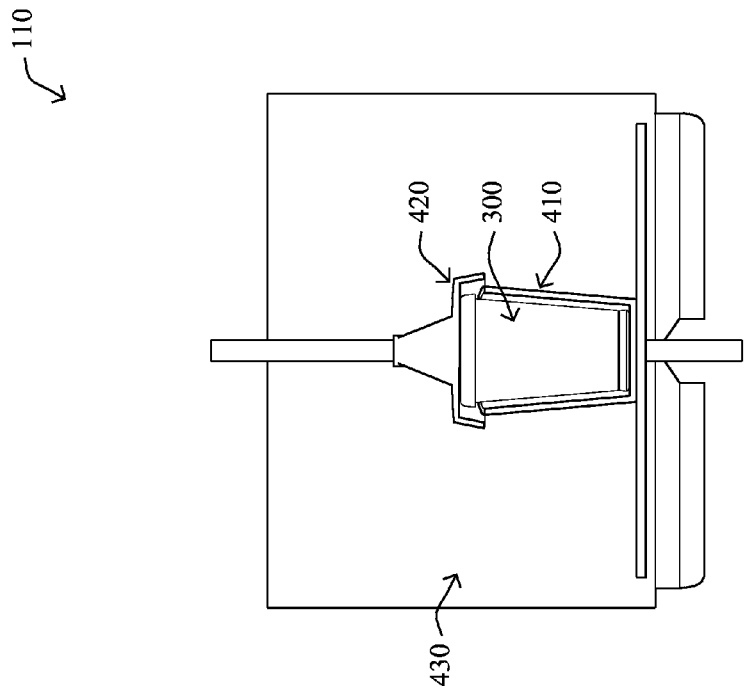
FIGS. 4A and 4B illustrate example cutaway views of the mixer for food products of FIG. 1 (open and closed position) in accordance with one or more embodiments herein.
Figure 4B:
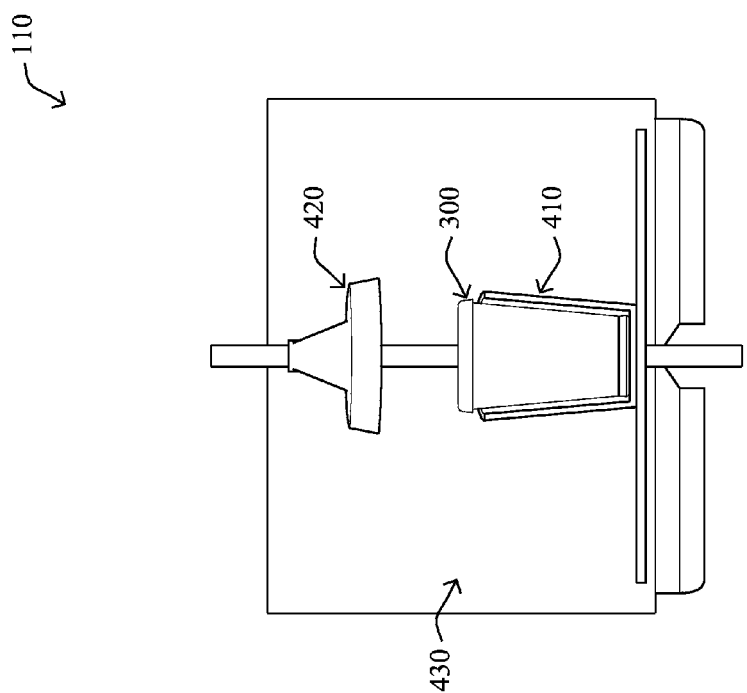

To protect against accidental breach of the product cup 300, as well as other sources of potential contamination of the mixer's mixing chamber 110 (e.g., external cup contamination and/or condensation), an addition layer of protection may be afforded by one or more embodiments herein. In particular, a cup holder and cup cover may surround the product cup 300, thus providing a "double seal" with the product cup's seal 330. FIGS. 4A and 4B illustrate example cutaway views of the mixer for food products of FIG. 1 (open and closed position) in accordance with one or more embodiments herein, where a cup holder 410 is meant to receive the cup 300 (when open as in FIG. 4A), and a cup cover (or lid) 420 clamps down onto the cup holder 410 (as shown in FIG. 4B), creating the secondary seal, so if the product were to breach the sides of cup 300 (or other contaminates were on the outside of the cup), the vast majority of the mixing chamber 110 stays clean. The secondary seal is illustratively a compression-type seal (e.g., a rubber gasket compressed between the holder 410 and cover 420), though other types of seals are possible, such as overlapping components, screw threads, etc.

Notably, in one embodiment the cup cover 420 lifts directly away from the cup holder 410 (e.g., straight up and down) with enough clearance to allow insertion of the product cup 300 into the cup holder. In another embodiment, the cup cover 420 may additionally or alternatively be moved (e.g., twisted, rotated, pivoted, hinged, etc.) out of the way to allow access for the product cup 300.

Note further that although one particular "coverage ratio" of the cup holder 410 to the cup cover 420 is shown, i.e., how much of the product cup 300 is contained within the holder 410 versus the cover 420, any suitable ratio may be used. For example, the ratio may range all the way from 0-100% for either the holder 410 or the cover 420, such as ranging from a simple base upon which the product cup 300 rests (such that the cover contains 100% of the product cup) to a completely encompassing cup holder (such that the cover merely closes off the top of the holder). Also, other shapes or configurations of the cover 420 and the holder 410 are possible, and the view illustrated is merely an illustrative example.

As an additional measure for cleanliness, the illustrative mixer 100 may also comprise a cleaning basin 430 that essentially forms the mixing chamber 110, surrounding the internal mixing mechanisms. In a preferred embodiment, the door 120 may be located inside of this cleaning basin 430, though the door may also be located outside of the basin. With this cleaning basin 430, any drips or spills may be contained and easily cleaned without contaminating other components of the mixer 100 (e.g., motors, electronics, etc.).

Figure 5:
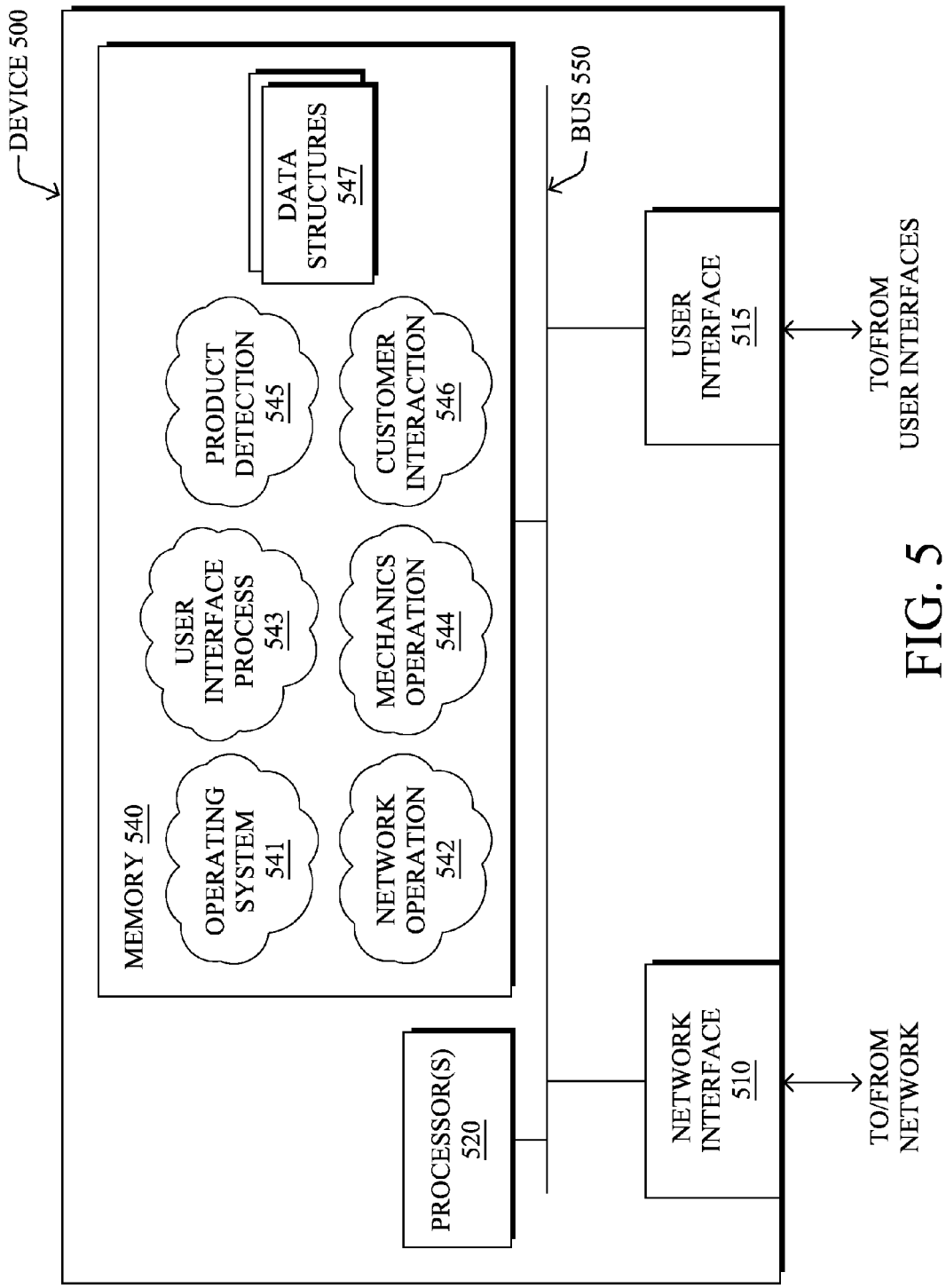
FIG. 5 illustrates an example schematic block diagram of a control system for a mixer for food products in accordance with one or more embodiments herein.

Behind the operation of the mixer 100 is the hardware and software required for operability. In particular, FIG. 5 illustrates an example simplified block diagram of such hardware and software of a control system 500 for a mixer for food products in accordance with one or more embodiments herein. In particular, the system 500 may comprise one or more network interfaces 510 (e.g., wired, wireless, etc.), a user interface 515, at least one processor 520, and a memory 540 interconnected by a system bus 550. The memory 540 comprises a plurality of storage locations that are addressable by the processor 520 for storing software programs and data structures associated with the embodiments described herein. The processor 520 may comprise hardware elements or hardware logic adapted to execute the software programs and manipulate the data structures 547. An operating system 541, portions of which are resident in memory 540 and executed by the processor, may be used to functionally organize the mixer's control system by invoking operations in support of software processes and/or services executing on the system. These software processes and/or services may comprise, illustratively, a network operations process 542, a user interface process 543, a mechanics operation process 544, a product detection process 545, a customer interaction (e.g., point of sale) process 546, etc.

It will be apparent to those skilled in the art that other processor and memory types, including various computer-readable media, may be used to store and execute program instructions pertaining to the techniques described herein. For example, the system 500 may be microprocessor controlled, microcontroller controlled, or other control by embedded systems/processors/etc. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In terms of functionality, the interrelated features of the system 100 herein may be implemented by the processes 542-546, which contain computer executable instructions executed by the processor 520 to perform such functions either singly or in various combinations. For instance, network operations process 542 may allow for communication over network interfaces 510 for various purposes, such as remote system maintenance (e.g., software upgrades, firmware updates, system analytics, etc.), product metric tracking (e.g., quantities purchased, types of products purchased, etc.), social communication (e.g., displayed content/marketing, consumer feedback, etc. via the user interface 130), communication with auxiliary components (e.g., refrigerators and freezers), and so on.

The user interface process 543, in particular, allows for interaction with a consumer through user interface 130 (received internally for processing by user interface 515), whether it be detection of a single "start" button, selection of particular mixing and/or product parameters via a touch screen, or other user interfaces. User interface process 542 may also interact wirelessly (via network interface 510) with a user, such as via apps on a smart device (smartphone, tablet, etc.), for user preference information, customer loyalty coordination, social media connectivity, and so on. As a separate component, or else integrated with user interface 130 and process 543, the customer interaction (e.g., point of sale) process 546 may comprise any necessary programming and authentication processes to interact financially with the customer, such as receiving credit card information through user interface 130 and processing such payment information with a financial server (via network operations process 542), printing receipts, etc.

Mechanics operation process 544 contains computer executable instructions executed by the processor 520 to perform functions related to the mechanical operations of the mixing mechanisms, such as controlling doors, cup covers, specific mixer motions (e.g., directions, duration, frequency, speed, distance, etc.). Specifically, the mechanics operation process 544 may control various actuators and/or motors to direct their functionality as they relate to the system processes as described herein.

Lastly, product detection process 545 may be configured to detect presence of a product. For example, the product detection process 545 may be used to prevent operation of the mixer 100 without a product or without an authorized product. For example, attempting to mix without a product in place may cause damage to certain components expecting the weight/presence of the product, while attempting to mix with unauthorized products (such as misplacing a carbonated drink into the mixer or other unsuitable objects) may also be problematic. Certain sensors may be in place to ensure proper product placement, such as weight, visual, RFID, etc. In addition, in certain embodiments, the product detection process 545 may also be used to detect actual product characteristics, such as weight, temperature, product type/identification, etc., as mentioned above.

Note that while certain processes and functionalities are shown and described herein, any suitable set of control processes may be used in accordance with the techniques herein, and those shown herein are merely one example implementation. Additional or fewer processes may actually be used, whether enabling the same level of functionality or more or less functionality, accordingly.

Figure 6:
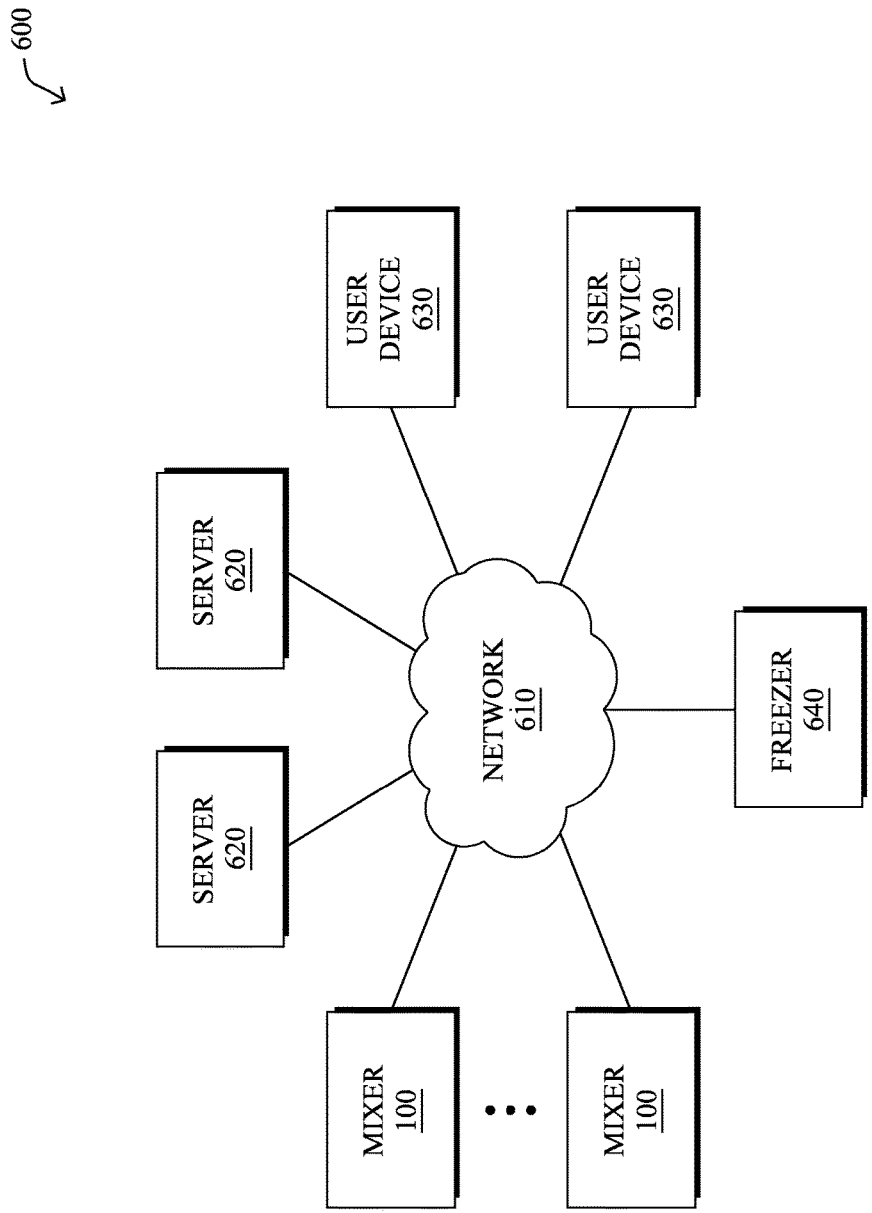
FIG. 6 illustrates an example communication network for use with a mixer for food products in accordance with one or more embodiments herein.

Additionally, FIG. 6 illustrates an example communication network 600 for use with a mixer for food products in accordance with one or more embodiments herein. For instance, one or more mixers 100 may be connected to a network 610 (e.g., wide area network, local area network, cellular network, personal area network, etc.) via the network interface 510 (e.g., wireless/Wi-Fi, wired/tethered, power-line communication, etc.). One or more servers 620 may also be connected to the network 610, and may communicate with the mixer(s) 100 in order to obtain usage data, provide software and/or firmware upgrades, provide media content, etc. In one or more particular embodiments, one or more user devices 630 may also be connected to the network 610 or directly with the mixer 100, capable of communicating directly with the mixer(s) 100 or else with the server(s) 620 for various user communications as mentioned above (e.g., social media, mixer control, etc.).

In addition, in certain embodiments, one or more freezers, coolers, and/or refrigerators 640 may also be networked within the communication network 600. For instance, the device(s) 640 may be in local communication with an associated mixer 100, or else via individual communication with the network 610 (e.g., to servers 620). Connected devices 640 allow for the monitoring and feedback control of temperatures, detection of product inventory, etc. In general, the devices 640 may be purpose-built in association with the mixers 100 (e.g., manufacturer-specific and designed for such monitoring and communication), or else may simply be standard devices with added capability components (e.g., stand-alone sensors inserted into the devices, etc.).

In accordance with one or more embodiments of the present invention, a specific mixing technique may be used as the mixing mechanism for the mixer 100 described above. That is, as mentioned above, the mixer 100 mixes a food product (e.g., mostly frozen) to a desired consistency without opening a sealed product cup 300 and without the use mixing blades, agitators, paddles, etc. being inserted into the food product. Specifically, the mixer 100 uses increased force created by controlled movement of the product cup 300 in order to mix the food product, where internal mixing occurs completely inside of the sealed product cup 300.

In particular, FIG. 7 illustrates an example of rapid-agitation mixing according to one or more embodiments of the present invention. The core of the rapid-agitation mixing mechanism illustrated in FIG. 7 includes shaking the food product cup 300 up and down vertically and generally violently. The rapid up-and-down reciprocating motion agitates (shakes, vibrates, etc.) the product within the cup 300 along an agitation axis 710 to the point that suitable product mixing can be performed to achieve the desirable consistency of the mixed product. Note that in one embodiment, the up-and-down motion can be linear as shown, while in another embodiment, the up-and-down motion may be slightly radial (e.g., extending as a pendulum from a drive source).

Figure 8B:
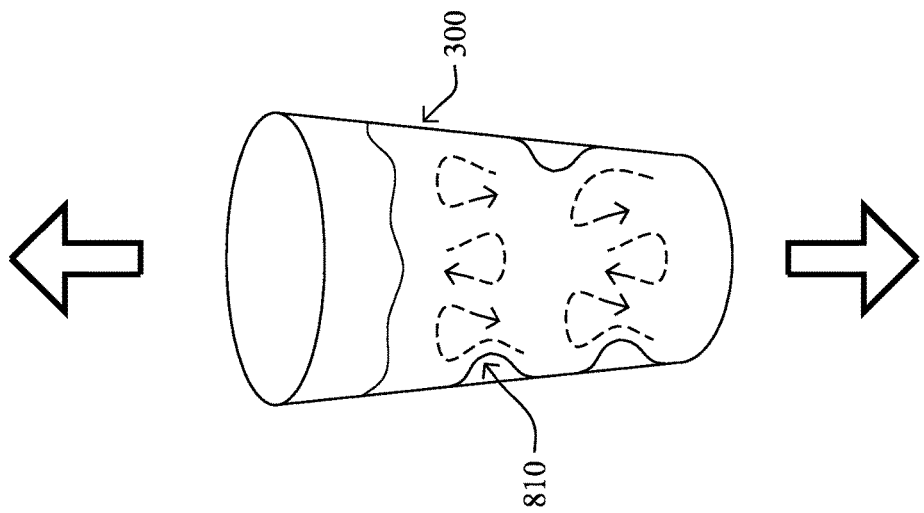
FIGS. 8A and 8B illustrate examples of food product mixing within a mixing cup (without internal blades and with internal blades) in accordance with one or more embodiments herein.
Figure 8A:
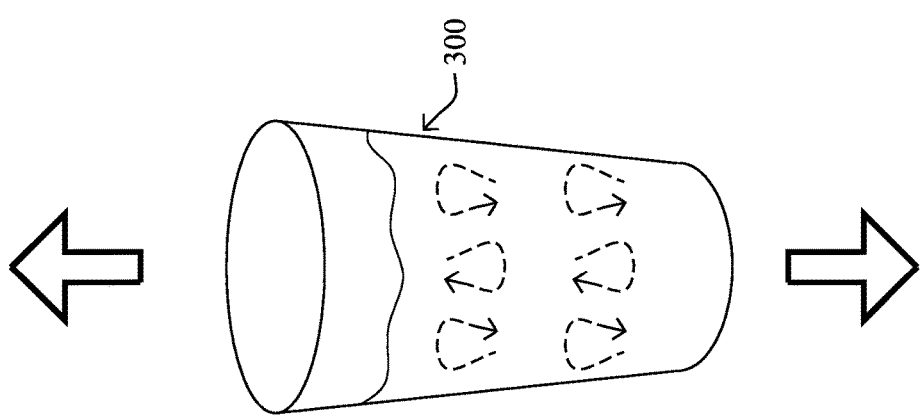

Examples of food product mixing within a mixing cup 300 using a rapid-agitation mixer are shown in FIGS. 8A and 8B. For instance, FIG. 8A illustrates an example of the mixing within the cup 300 without any internal agitation components (e.g., blades), showing the general mixing of the product. Conversely, FIG. 8B illustrates the installation of mixing paddles or blades 810 inside the cup for mixing and the associated mixing pattern. In general, it has been found through experimentation that the blades 810 are not necessary for adequate mixing, but there may be instances where they are beneficial, and are thus shown herein as being specifically contemplated.

Figure 9A:
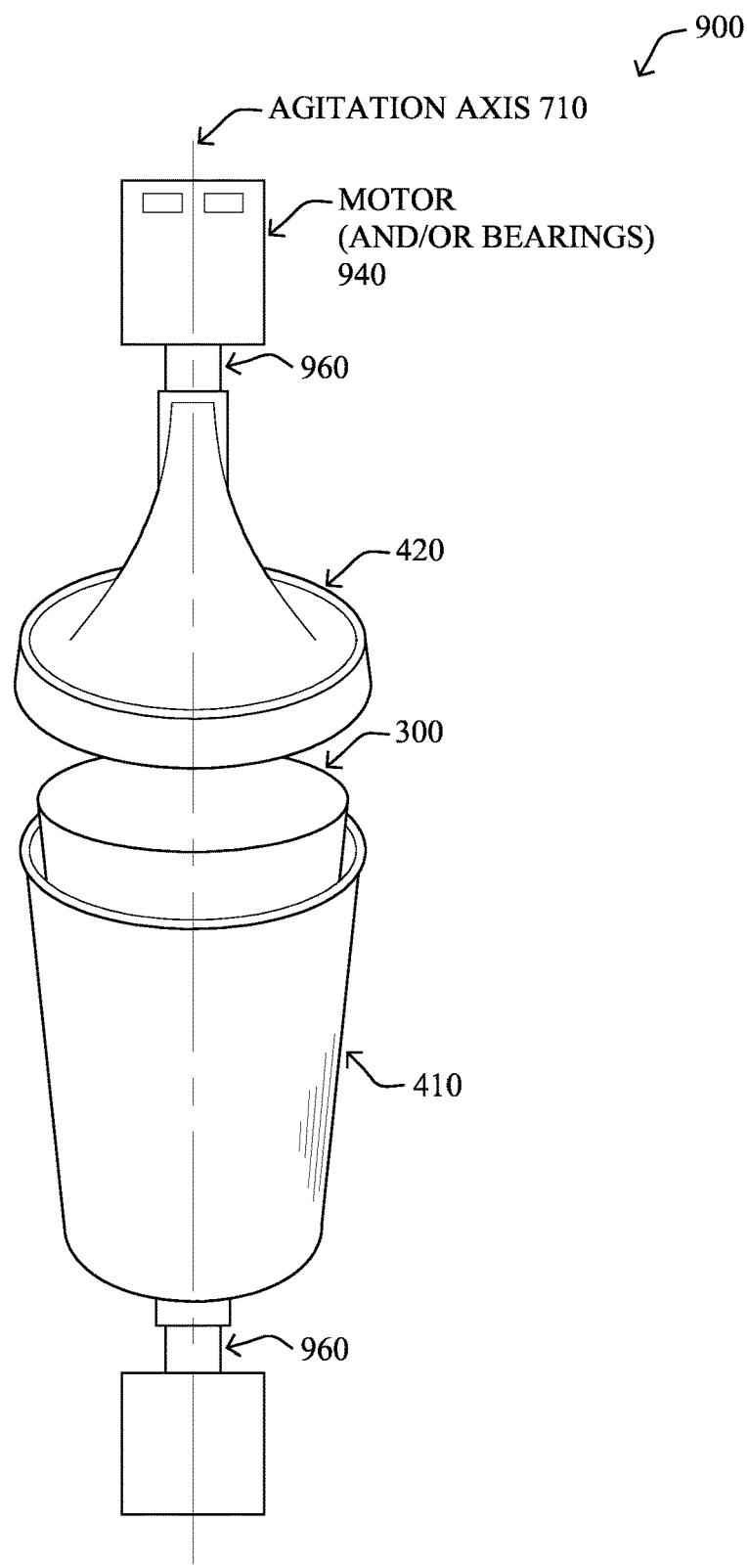
FIGS. 9A and 9B illustrate an example implementation of a rapid-agitation food product mixer (open and closed position) in accordance with one or more embodiments herein.
Figure 9B:
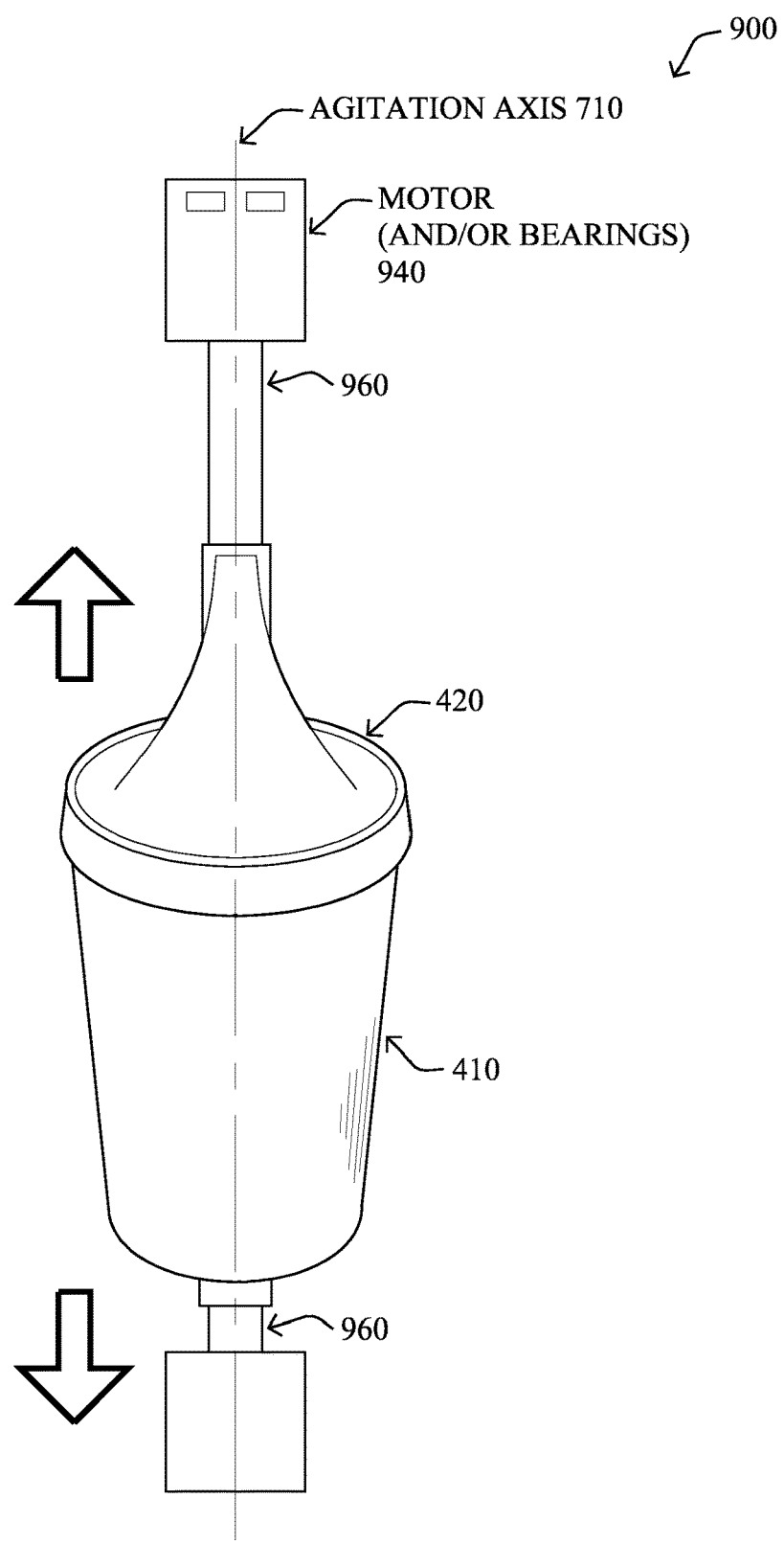

FIGS. 9A and 9B illustrate an example implementation of a rapid-agitation food product mixer (e.g., in the open and closed position, respectively) in accordance with one or more embodiments herein. In particular, the mixing mechanism 900 may specifically comprise the cup holder 410 and cup cover/lid 420 as described above, which may be configured to engage each other along the agitation axis 710, and driven by a drive shaft 960. Note that although shown contained within the agitation axis 710, the cup holder 410 and cup cover 420 may engage each other at an offset position from the agitation axis 710, or the agitation may occur along a generally radial path, as mentioned above. A motor 940 may drive the agitation, such as through oscillation, reciprocation, etc.

The effectiveness of the product mixing using mixing mechanism 900 in mixer 100 is based on a variety of configured and/or adjustable parameters, such as the speed of the agitation (e.g., oscillation frequency), as well as the distance of the "throw" or "swing" in either the up and down directions. Also, the effects of one parameter may require changes to one or more other parameters.

As one example, the distance of the throw can be chosen based on the desired outcome when used with particular agitation speeds, or vice versa. For instance, depending on the thickness of the food product (e.g., milkshake) for which the machine is designed, the agitation speed may need to be faster or slower to produce a desired mixing force on the food product. The same holds true for the distance of the throw to produce a desired mixing force within the product cup.

Generally, the rate of agitation within which rapid-agitation mixing may usefully take place is established as a lower threshold, below which no mixing occurs, and an upper threshold, above which no mixing occurs. The goal, therefore, is to agitate the product at a value between those lower and upper thresholds, accordingly.

Experimentally, a range of about 500-2000 cpm (cycles per minute) resulted in good mixing qualities for the milkshakes, where speeds around 1200-1400 cpm of vertical agitation was a preferred lower threshold for mixing a good milkshake. The distance of the throw or swing was also generally limited to approximately 10-60 mm. Note that any suitable values may be used so long as adequate mixing is provided without separating out solids or otherwise creating an undesired consistency of the final product.

Another factor to consider is the duration of the mixing. In general, there is a lower limit to the mixing time required to adequately mix the food product and to create the desired consistency, as well as an upper limit to the time to prevent over-mixing and producing a diminished consistency. (User perception of the wait time is also an important factor in the duration of the mixing.) Through the experimentation above, suitable mixing may occur between 10 and 45 seconds, preferably after about 20-30 seconds of mixing.

Figure 10:
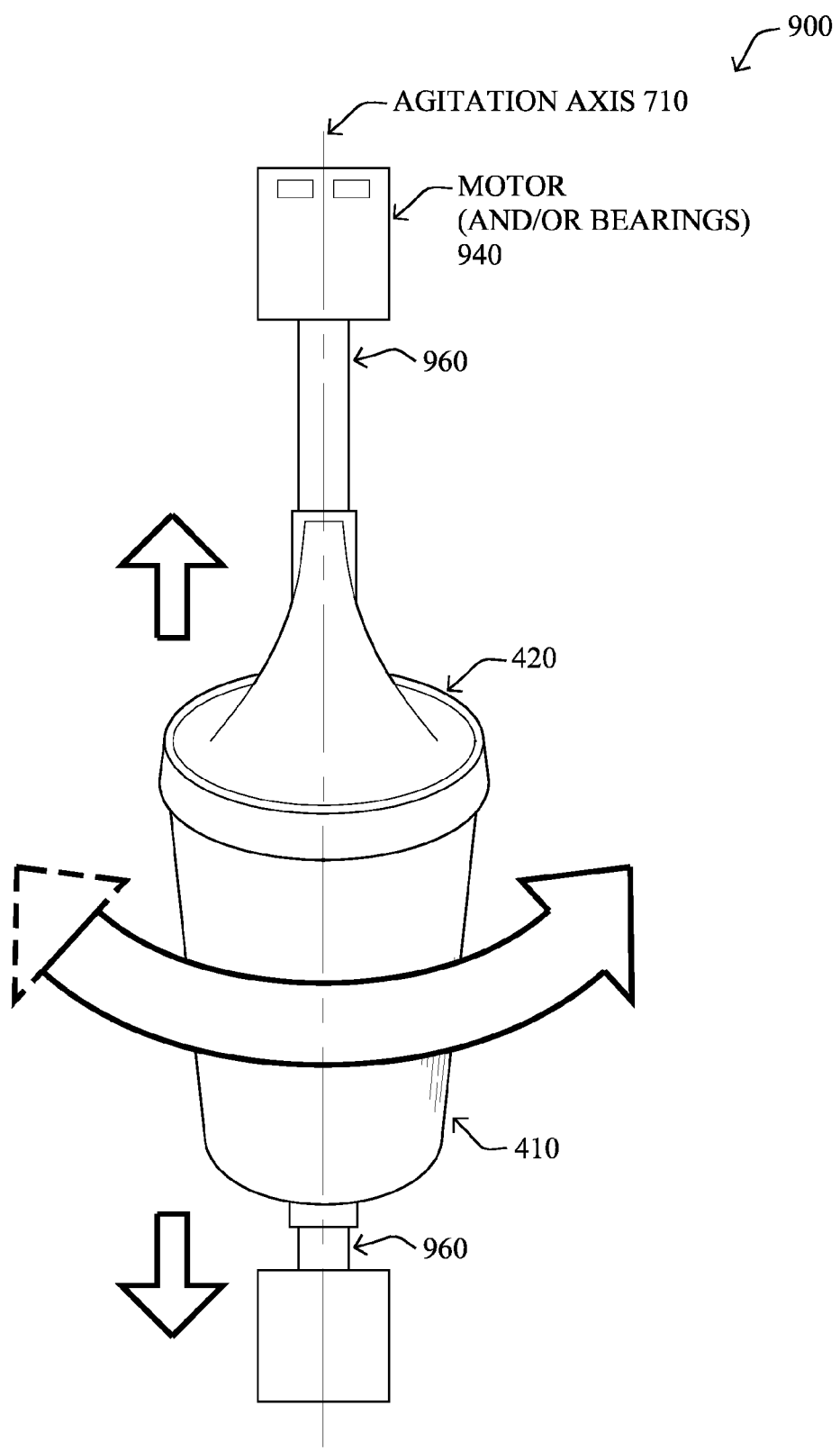
FIG. 10 illustrates an example alternative implementation of a rapid-agitation food product mixer (twisting the container) in accordance with one or more embodiments herein.
Figure 11:
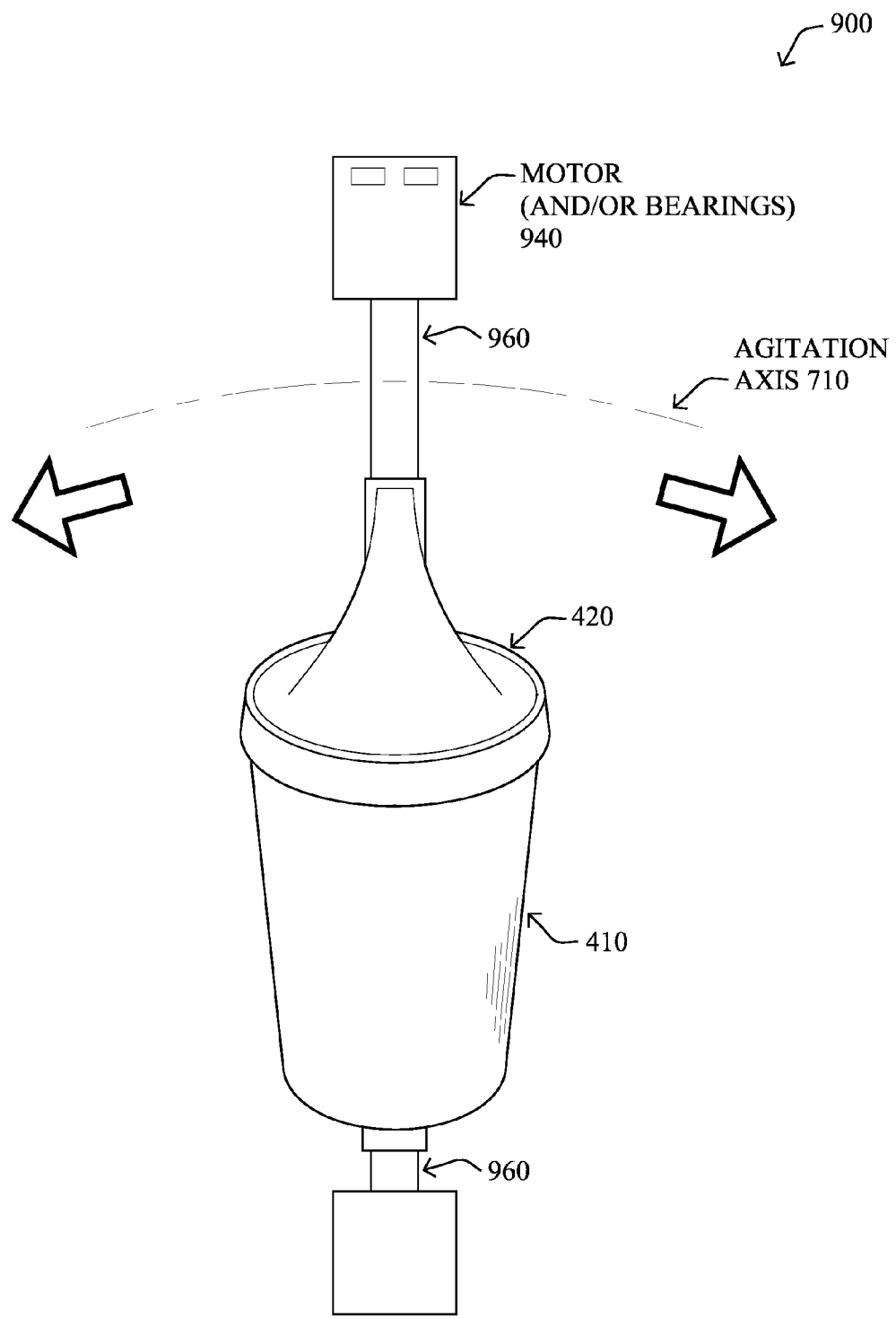
FIG. 11 illustrates another example alternative implementation of a rapid-agitation food product mixer (agitating side-to-side) in accordance with one or more embodiments herein.
Figure 12:
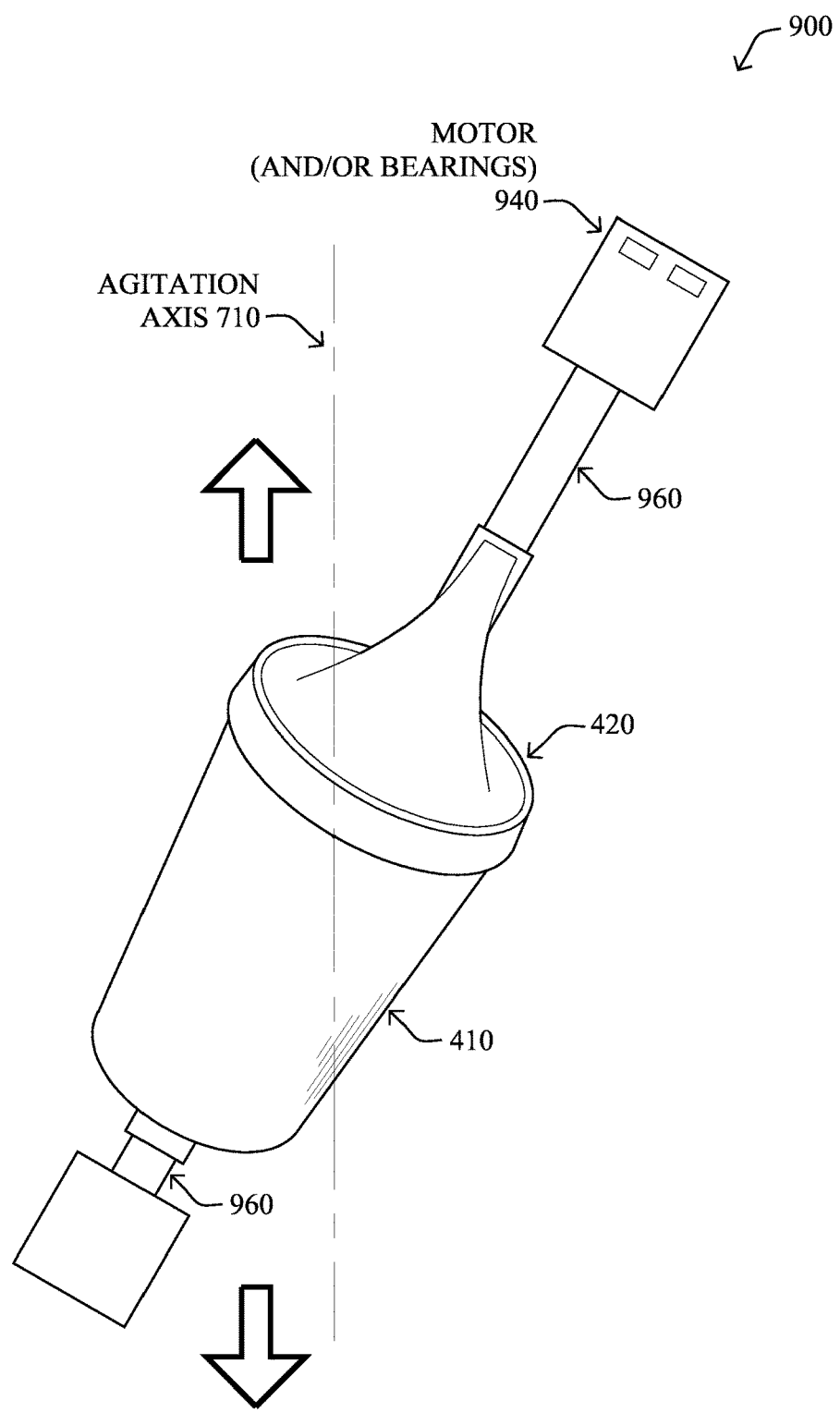
FIG. 12 illustrates yet another example implementation of a rapid-agitation food product mixer (off-axis agitation and optional rotation) in accordance with one or more embodiments herein.

FIGS. 10-12 illustrate example alternative implementations of a rapid-agitation food product mixer in accordance with one or more embodiments herein. For instance, in FIG. 10, an additional range of motion may be provided to rotate (twist) the product cup 300 during the rapid agitation. For example, in one embodiment, the product cup may be rotated completely (e.g., continuously circling in one single direction), or else may be oscillated back and forth (e.g., twisted in a first direction, and then twisted in a reverse direction). Though experimentation of this concept on a vertically agitated product provided minimal results (e.g., alternating reciprocation at 700 rpm), other orientations of the agitation may benefit from such additional ranges of motion.

In addition, FIG. 11 illustrates another example alternative implementation of a rapid-agitation food product mixer in accordance with one or more embodiments herein, where the product cup is agitated side-to-side (while still remaining upright), rather than up-and-down. Also, FIG. 12 illustrates yet another example implementation of a rapid-agitation food product mixer in accordance with one or more embodiments herein, where off-axis agitation is performed. That is, the product cup may be placed at an angle with respect to the direction of the agitation. Though similar results may be obtained in FIGS. 11 and 12 to those of FIG. 9, the optional rotation of FIG. 10 in combination with FIGS. 11 and 12 may provide additional benefits not originally present in FIG. 9's merely vertical orientation.

Figure 13A:
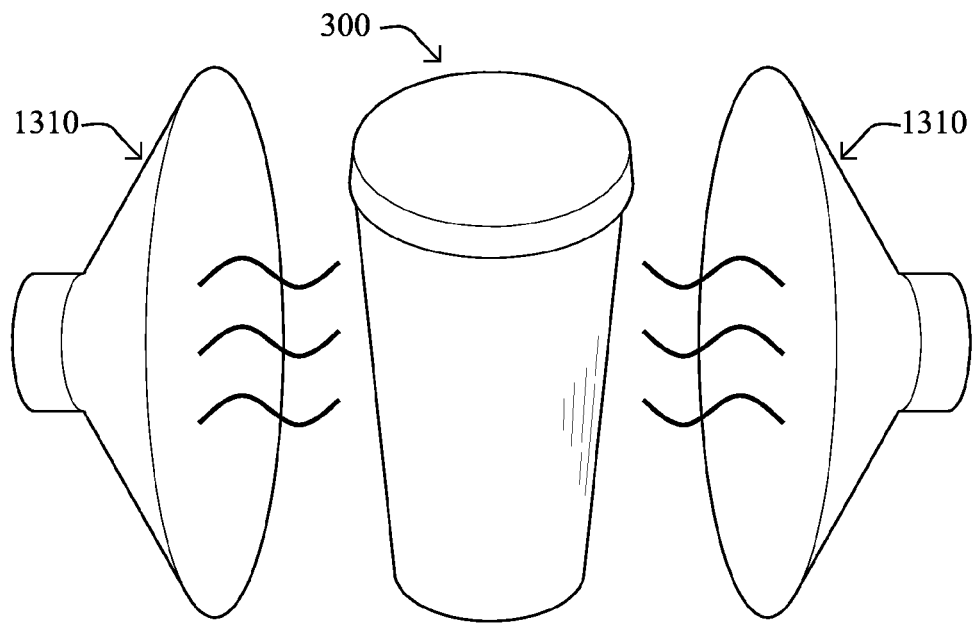
FIGS. 13A and 13B illustrate examples of food product heating (system and cup-specific) in accordance with one or more embodiments herein.
Figure 13B:
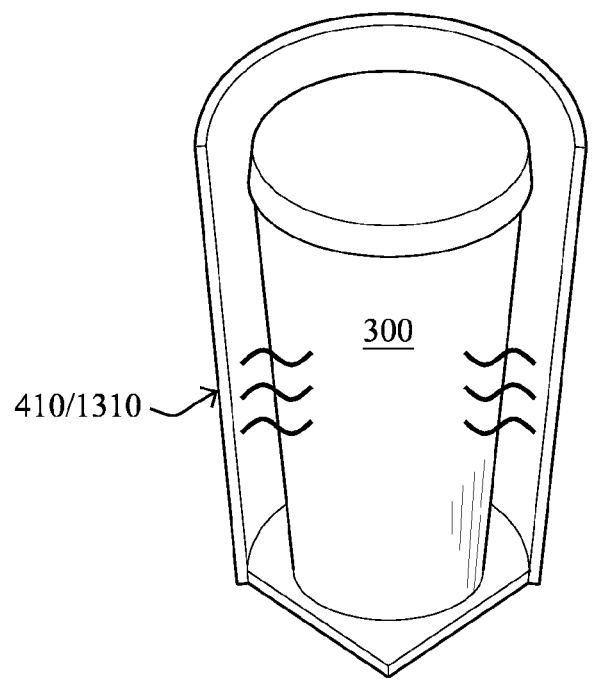

Note that in one or more embodiments herein, it may be optional to provide heat to the product cup 300 during the mixing described above. Generally, it has been determined that external heating is not required in the mix time allotted, and all observed increases in temperature in the product is due to the physical act of mixing (physical movement at the molecular level). Also, when there is no an ambient air heating, the techniques herein are able to close off the cup holder 410 with cap 420 to help avoid catastrophic spills inside the machine during mixing. At the same time, however, it may be possible and desirable to provide heat to the product, and as such, FIGS. 13A and 13B illustrate examples of food product heating in accordance with one or more embodiments herein. For instance, in FIG. 13A, heat may be supplied by one or more heat sources 1310, such as heating lamps, coils, microwaves, etc., located external to the product cup 300, particularly external to any holding cup 410 used to contain the product cup. Since embodiments where the holding cup is generally designed to contain any accidental spills (as opposed to, say, a wire cage or other air/heat permeable holder), FIG. 13B illustrates an alternative embodiment where the heat source 1310 may be located as part of the holding cup 410 (e.g., and/or cover 420).

Figure 14:
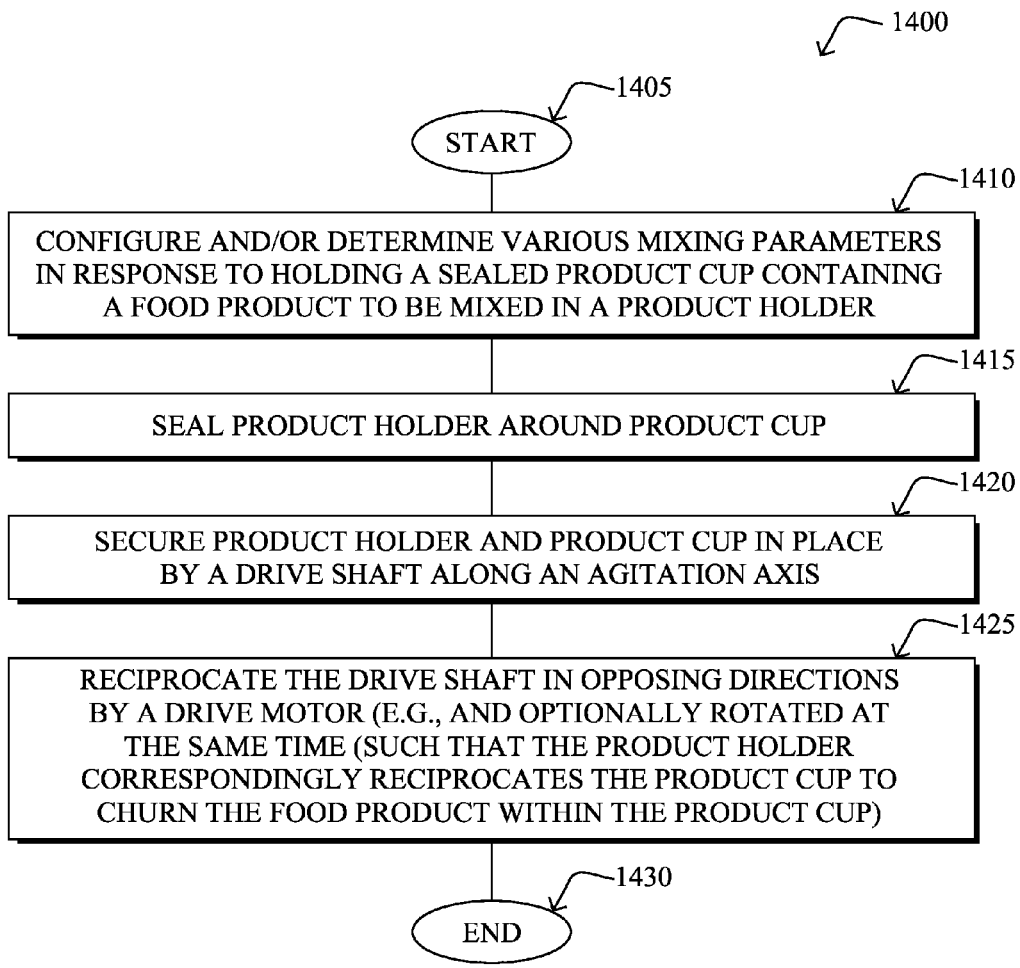
FIG. 14 illustrates an example simplified procedure for rapid-agitation mixing of food products in accordance with one or more embodiments herein.

FIG. 14 illustrates an example simplified procedure for rapid-agitation mixing of food products in accordance with one or more embodiments herein. The procedure 1400 may start at step 1405, and continues to step 1410, where various mixing parameters are configured and/or determined (e.g., speed, duration, etc.) in response to holding a sealed product cup containing a food product to be mixed in a product holder. In step 1415, the product holder may be sealed around the product cup. Then, in step 1420, the product holder and product cup are secured in place by a drive shaft along an agitation axis, such that in step 1425 the drive shaft may be reciprocated in opposing directions by a drive motor (e.g., and optionally rotated at the same time, as mentioned above). In this manner, according to the techniques herein, as described in greater detail above, the product holder correspondingly reciprocates the product cup to churn the food product within the product cup. The simplified procedure 1400 then ends in step 1430, notably after providing access to the mixed food product.

It should be noted that while certain steps within procedures 200 and 1400 may be optional as described above, the steps shown in FIGS. 2 and 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. More-over, while procedures 200 and 1400 are described separately, certain steps from each procedure may be incorporated into each other procedure, and the procedures are not meant to be mutually exclusive.

Notably, the embodiments described herein may be applied to any suitable food product, and particularly to any type of ice cream used to make a milkshake, malt, or other ice cream beverages. In particular, the operating ranges of the mixing mechanics described in the embodiment above herein may generally be applicable to any formula of ice cream, including any set of ingredients, a wide range of product temperatures, and so on. That is, the dimensions of the product, the relative orientations, the speeds or frequencies of the mixing, the duration of the mixing, etc. can be set to a general configuration to handle many variations in product characteristics, or else may be adjusted manually or in response to one or more product characterizations.

In addition, the specific placement of components in relation to each other, particularly driving motors, can be anywhere that is suitable for various design considerations within the mixer 100. Also, where any gears, drive belts, or chains are specifically mentioned above, such driving mechanisms may be interchanged.

Figure 15:
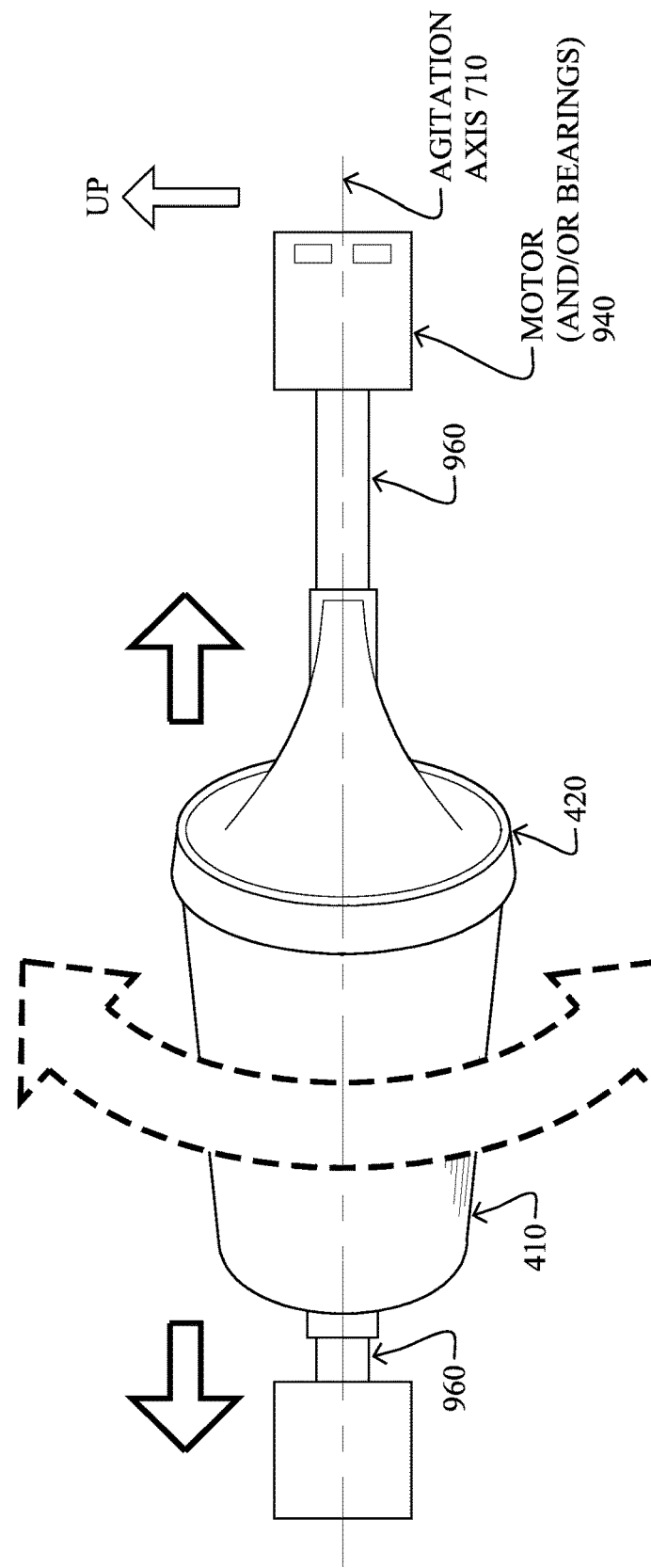
FIG. 15 illustrates an example of an alternative orientation of a rapid-agitation food product mixer in accordance with one or more embodiments herein.

Other alternative orientations of the mixer 100 may also be contemplated with substantially similar results to those orientations shown and described above, where various mechanisms can be mounted in any orientation that is advantageous to loading the product cup 300 or to machine layout and/or performance. For instance, FIG. 15 illustrates an example of an alternative orientation of a rapid-agitation food product mixer in accordance with one or more embodiments herein. For example, as shown in FIG. 15, the agitation system described above can be placed at any angle, including being completely horizontal, as shown. Note that in this embodiment, it may be beneficial to rotate the product cup (e.g., with a center axis as the center of the cup) such that enhanced mixing can occur to eliminate the tendency for product settlement/sedimentation due to gravity.

Figure 16B:
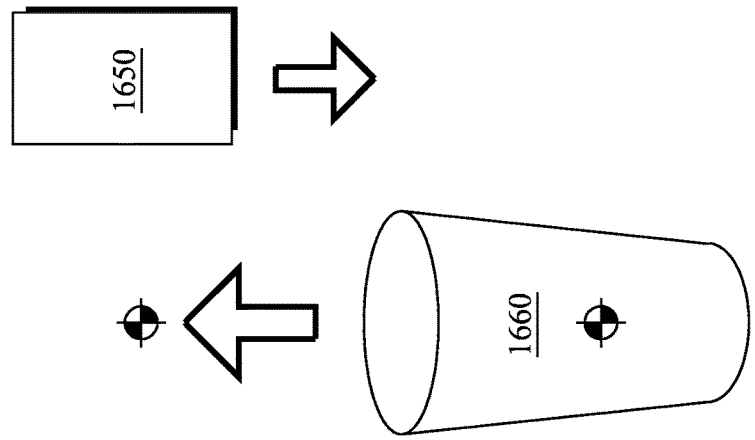
FIGS. 16A and 16B illustrate examples of counterweights used in a rapid-agitation food product mixer in accordance with one or more embodiments herein.
Figure 16A:
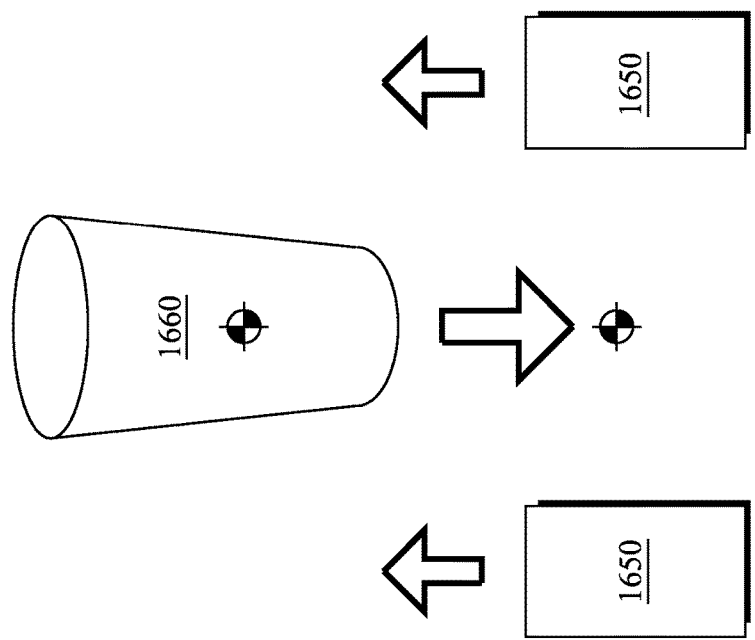

In addition, a counterbalancing system may be used in certain embodiments in order to balance the high-speed agitation of the system, and to thus prevent problematic vibrations. For instance, FIGS. 16A and 16B illustrate examples of counterweights used in a rapid-agitation food product mixer in accordance with one or more embodiments herein. In particular, in the illustrative example, one or more dynamic counterbalance weights 1650 may reciprocate a mass substantially equal to the reciprocating mixer mass 1660 (e.g., representing the shaft 960, cup 300, holder 410, cap 420, etc.), where the counterbalance weights reciprocate substantially 180 degrees out-of-phase (e.g., mirroring each other's motion). Note that in one embodiment, as shown, this counterbalance mass 1650 may be split so that the center of gravity of the counterbalance translates along the same axis 710 as the center of gravity of the reciprocating mixer mass 1660. However, in another embodiment, the counterbalance mass may otherwise encircle the mass of the mixing mechanism. Note further that the counterweight 1650 can be located anywhere suitable to balance the mixing system (e.g., attached to the bottom, top, sprung to the holder/shaft/etc., and so on). Those skilled in the art will also appreciate that while it is advisable to balance an agitating system, establishing a balanced system is merely preferable, and is not meant to be limiting the scope of the invention described herein.

The systems and techniques described in detail above thus provide for an advanced automated food product mixer. In particular, the techniques herein offer an enhanced consumer experience, being simple to use and effective in producing an optimal consumable product, particularly in terms of product consistency. The system herein also has provisions for cleanliness that are not available in current systems, improving both sanitary conditions of the system as well as eliminating cross-contamination of products, each being especially beneficial for systems where multiple consumers use the machine without server intervention, such as when placed in convenience stores or self-serve stations at restaurants.

While there have been shown and described illustrative embodiments, it is to be understood that various other adaptations and modifications may be made within the spirit and scope of the embodiments herein, regardless of whether they were specifically mentioned herein. For instance, certain techniques or features that are currently understood in the art may be viable alterations to the examples described above (e.g., in terms of both the food product itself as well as mechanical or electrical components of the automated machinery).

In addition, while the system and techniques above have been generally described in terms of food products relating to milkshakes, malts, or other ice cream beverages, other food products (solid, semi-solid, liquid, frozen, thawed, semi-frozen, etc.) may take advantage of the techniques above, where applicable. Accordingly, the present invention, though preferably directed toward milkshakes, malts, or other ice cream-like beverages, is not intended to be limited as such.

Furthermore, it is also expressly contemplated that certain components and/or elements described herein can be implemented as software being stored on a tangible (non-transitory) computer-readable medium (e.g., disks, CDs, RAM, EEPROM, etc.) having program instructions executing on a computer, hardware, firmware, or a combination thereof.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for dual-axis mixing of food products in a dual axis mixing apparatus, the method comprising:
   holding a sealed product cup containing a food product to be mixed in a product holder;
   sealing, via a cup cover moveably attached to the dual axis mixing apparatus, the sealed product cup to provide a secondary seal to the sealed product cup;
   securing the product holder and product cup in place by moving the cup cover vertically on a drive shaft along an agitation axis; and
   reciprocating the drive shaft in opposing directions by a drive motor,
      wherein the product holder correspondingly reciprocates the product cup to churn the food product within the product cup.

2. The method as in claim 1, wherein the food product is an ice cream product.

3. The method as in claim 1, wherein sealing further comprising:
   sealing the product holder around the product cup.

4. The method as in claim 1, wherein the agitation axis is linear along the drive shaft.

5. The method as in claim 1, further comprising:
   rotating the drive shaft.

6. The method as in claim 5, wherein the drive shaft is rotated in a continuous circular motion.

7. The method as in claim 5, wherein the drive shaft is rotated in an oscillating back-and-forth motion.

8. The method of claim 1, wherein the product cup comprises one or more internal agitation components within the product cup and further comprises:
   rotating the one or more internal agitation components and the drive shaft simultaneously.

9. The method as in claim 1, further comprising:
   while reciprocating the drive shaft, heating, by a heat source attached to the dual mixing apparatus, the product cup to heat to the food product to a point where the food product can be mixed.

10. The method as in claim 1, wherein reciprocating further comprises:
    adjusting, by the dual axis mixing apparatus, a throw distance of the drive shaft based a particular agitation speed used to mix the food product.

11. The method as in claim 1, wherein the product holder includes a cup holder, wherein the cup holder and the cup cover join together to form the secondary seal.

12. The method as in claim 1, wherein a counter-balancing system is substantially 180 degrees out-of-phase from the reciprocating product holder and product cup.

* * * * *